(12) United States Patent
Sakai et al.

(10) Patent No.: US 7,762,705 B2
(45) Date of Patent: Jul. 27, 2010

(54) SURFACE LIGHT SOURCE DEVICE AND DISPLAY DEVICE USING THE SAME

(75) Inventors: Seiji Sakai, Tokyo (JP); Toshiyuki Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 165 days.

(21) Appl. No.: 11/609,488

(22) Filed: Dec. 12, 2006

(65) Prior Publication Data

US 2007/0147073 A1 Jun. 28, 2007

(30) Foreign Application Priority Data

Dec. 15, 2005 (JP) ............................ 2005-361208
Oct. 24, 2006 (JP) ............................ 2006-288512

(51) Int. Cl.
*G02B 6/10* (2006.01)

(52) U.S. Cl. ....................... 362/619; 362/623; 362/603; 362/307; 362/610; 362/97.3; 362/800

(58) Field of Classification Search ................ 362/623, 362/603, 621, 622, 307, 310, 327, 610, 615, 362/617, 619, 625, 628, 97.1, 97.2, 97.3, 362/33; 349/62, 64; 40/563, 564

See application file for complete search history.

(56) References Cited

U.S. PATENT DOCUMENTS

| | | | | |
|---|---|---|---|---|
| 4,943,689 | A * | 7/1990 | Siefer et al. ............... | 178/18.11 |
| 6,561,663 | B2 * | 5/2003 | Adachi et al. ............... | 362/616 |
| 7,063,430 | B2 * | 6/2006 | Greiner ....................... | 362/30 |
| 7,287,891 | B1 * | 10/2007 | Park et al. .................... | 362/555 |
| 7,654,687 | B2 * | 2/2010 | Tsai et al. ..................... | 362/237 |

(Continued)

FOREIGN PATENT DOCUMENTS

CN 1584708 A 2/2005

(Continued)

OTHER PUBLICATIONS

U.S. Appl. No. 11/561,603, filed Nov. 20, 2006, Sakai, et al.

*Primary Examiner*—Sandra L O'Shea
*Assistant Examiner*—Leah S Lovell
(74) *Attorney, Agent, or Firm*—Oblon, Spivak, McClelland, Maier & Neustadt, L.L.P.

(57) ABSTRACT

A surface light source device according to the invention includes a housing having an opening portion on at least one face, an LED light source held by one face of the housing opposing the opening portion, and a light guiding plate arranged at a position so as to cover the opening portion and the LED light source. The light guiding plate includes a recess provided at a position corresponding to the LED light source for storing a part of the LED light source. A light quantity adjusting means is provided at a bottom part of the recess for adjusting light from the LED light source. The light quantity adjusting means includes a reflection sheet having a reflection function and a transmission function in which a total light transmittance t satisfies $t \geq \pi r^2 \cos\theta / \{(1-\cos\theta)(S-\pi r^2)\}$, supposing that an average radius is defined as r, a distance from the LED light source is defined as H, a light-emitting area of the LED light source is defined as S, and a total light quantity is defined as L.

20 Claims, 5 Drawing Sheets

U.S. PATENT DOCUMENTS

| | | |
|---|---|---|
| 7,654,719 B2 * | 2/2010 | Chang ........................ 362/606 |
| 2005/0024845 A1 | 2/2005 | Mori et al. |
| 2006/0139960 A1 | 6/2006 | Sakai et al. |
| 2006/0262530 A1 | 11/2006 | Sakai et al. |

FOREIGN PATENT DOCUMENTS

| | | |
|---|---|---|
| CN | 1797115 A | 7/2006 |
| JP | 10-82916 | 3/1998 |
| JP | 10-104620 | 4/1998 |
| JP | 2000-267096 | 9/2000 |
| JP | 3427636 | 5/2003 |

* cited by examiner

<SIDE OPPOSITE TO
LED LIGHT SOURCE>

<SIDE OF LED
LIGHT SOURCE>

SURFACE LIGHT SOURCE DEVICE AND DISPLAY DEVICE USING THE SAME

BACKGROUND OF THE INVENTION

1. Field of the Invention

The present invention relates to a light source, and more particularly to a surface light source device and a display device using the same.

2. Description of the Background Art

A conventional surface light source device has a configuration, as disclosed in Japanese Patent Publication No. 3427636, in which a conic recess is provided in order to insert a light source on a back face of a light guiding plate and a light source such as an LED is fixed to the recess. Since the recess for inserting the light source has a conic shape, a width thereof becomes narrower toward a far side from at least a leading end thereof. Therefore, the conventional surface light source device can reduce quantity of light directly emitted from the light source and produce luminous unevenness.

A surface light source device disclosed in Japanese Patent Application Laid-Open No. 10-82916(1998) has a configuration in which a light source such as an LED is pressedly inserted into a light source insertion section formed on a rear face of a light guiding plate, and a light reflection surface is formed ahead of the light source. The light reflection surface shields light emitted from the light source and directing ahead, and reflected light is guided from a side wall face of the light source insertion section into an inside of the light guiding plate, whereby luminous distribution on a light emitting surface of the light guiding plate is made uniform.

A liquid display device disclosed in Japanese Patent Application Laid-Open No. 10-104620(1998) has a configuration in which a groove for housing a cold cathode fluorescent tube is formed at a central lower part of a light guiding plate, and a light shielding quantity or reflection quantity is adjusted by a pattern or the like on a translucent adjusting film arranged on a bottom surface of the groove, whereby luminance is uniform all over a display surface and efficiency of use of the cold cathode fluorescent tube is enhanced.

However, even if the conventional surface light source device disclosed in Japanese Patent Publication No. 3427636 is used, the luminance at the conic recess becomes slightly higher than that at the other portions. Therefore, when uniform in-plane luminance is further demanded, sufficient display quality cannot be obtained from the conventional surface light source device.

When the conventional surface light source device disclosed in Japanese Patent Application Laid-Open No. 10-82916(1998) is used, direct light toward ahead of the light source is partially transmitted. Therefore, the light is not fully diffused, thereby entailing a problem that luminous unevenness is generated ahead of the light source.

Even when the conventional surface light source device disclosed in Japanese Patent Application Laid-Open No. 10-104620(1998) is used, direct light from the light source is adjusted as shielded by a pattern or the like. Therefore, the light is not fully diffused, thereby entailing a problem that luminous unevenness is generated ahead of the light source.

SUMMARY OF THE INVENTION

The present invention aims to provide a surface light source device having high efficiency of use of light, high evenness of in-plane luminance, and sufficient display quality, and a display device using the same.

The present invention provides a surface light source device including a housing having an opening portion on at least one face, a light source held by one face of the housing opposing the opening portion, and a light guiding plate arranged at a position so as to cover the opening portion and the light source. The light guiding plate includes a recess provided at a position corresponding to the light source for storing a part of the light source, and light quantity adjusting means provided at a bottom part of the recess for adjusting light from the light source. The light quantity adjusting means includes a reflection sheet having a reflection function for reflecting the light from the light source and a transmission function in which a total light transmittance t satisfies $t \geq \pi r^2 \cos\theta / \{(1-\cos\theta)(S-\pi r^2)\}$, supposing that an average radius is defined as r, a distance from the light source is defined as H, a light-emitting area of the light source is defined as S, and a total light quantity of the light source is defined as L.

Since, in the surface light source device, the light quantity adjusting means, provided at the bottom part of the recess for adjusting the light from the light source, includes the reflection sheet having a reflection function for reflecting the light from the light source and a transmission function in which the total light transmittance t satisfies $t \geq \pi r^2 \cos\theta / \{(1-\cos\theta)(S-\pi r^2)\}$, the surface light source device according to the present invention provides effects of enhancing efficiency of use of light, enhancing evenness of in-plane luminance, and providing sufficient display quality.

The present invention provides a display device including a surface light source device including a housing having an opening portion on at least one face, a light source held by one face of the housing opposing the opening portion, and a light guiding plate arranged at a position so as to cover the opening portion and the light source, and a display panel arranged above the opening portion of the surface light source device. The light guiding plate includes a recess provided at a position corresponding to the light source for storing a part of the light source, and light quantity adjusting means provided at a bottom part of the recess for adjusting light from the light source. The light quantity adjusting means includes a reflection sheet having a reflection function for reflecting the light from the light source and a transmission function in which a total light transmittance t satisfies $t \geq \pi r^2 \cos\theta / \{(1-\cos\theta)(S-\pi r^2)\}$, supposing that an average radius is defined as r, a distance from the light source is defined as H, a light-emitting area of the light source is defined as S, and a total light quantity of the light source is defined as L.

The display device according to the present invention provides effects of enhancing efficiency of use of light, enhancing evenness of in-plane surface luminance, and providing sufficient display quality.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
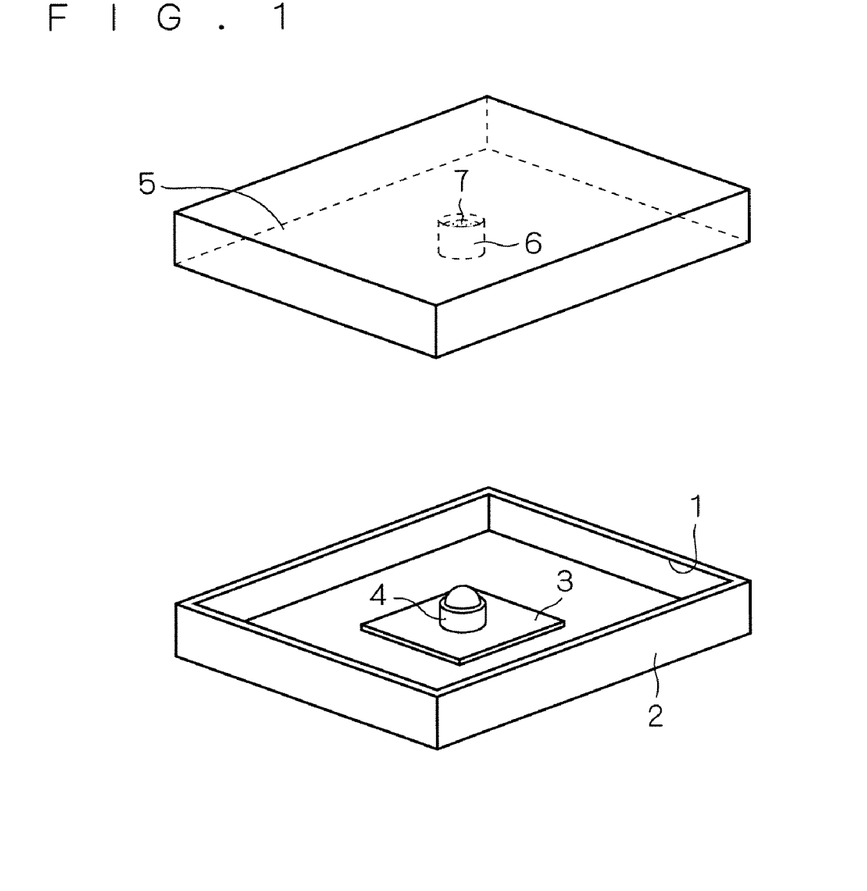
FIG. 1 is an exploded perspective view of a surface light source device according to an embodiment 1 of the present invention.
Figure 2:
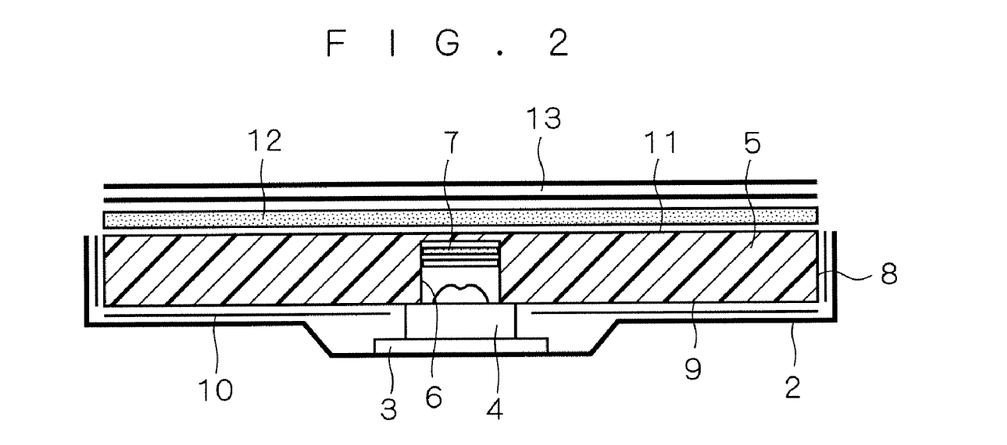
FIG. 2 is a sectional view of the surface light source device according to the embodiment 1 of the present invention.

FIG. 1 is an exploded perspective view of a first embodiment of a surface light source device according to the present invention. FIG. 2 is a sectional view of the first embodiment of the surface light source device according to the present invention. The surface light source device shown in FIG. 1 has a housing 2 having an opening 1 formed at its one face, an LED (Light Emitting Diode) light source 4 held at the face opposite to the opening 1 through an LED substrate 3, a light guiding plate 5 disposed at the position for covering the opening 1 and the LED light source 4, a cylindrical recess 6 formed at the position of the light guiding plate 5 corresponding to the LED light source 4, and light quantity adjusting means 7 provided at the bottom part of the recess 6. As apparent from FIG. 2, a part of the LED light source 4 is housed in the recess 6.

A reflection sheet 10 is provided between the light guiding plate 5 and the housing 2 (at the side face 8 and the reflection and emission face 9 of the light guiding plate 5). A diffusion plate 12 and optical sheet or the like 13 are provided all over the emission surface 11 of the light guiding plate 5. The emission surface 11 of the light guiding plate 5 agrees with the opening 1 of the housing 2.

A point light source such as a light-emitting diode (LED light source 4), a laser diode (LD), or the like is considered as the light source used in the first embodiment. Examples of the LED light source 4 include a semiconductor light-emitting device that emits monochromatic light such as blue light and a pseudo-white LED composed of a phosphor that absorbs a part of blue light emitted from a semiconductor light-emitting device and emits yellow light. Another examples of the LED light source 4 include an LED having semiconductor light-emitting devices of red, green, and blue, and composing three monochromatic lights to emit white light. The embodiment describes below is a case where the pseudo-white LED is used for the LED light source 4 of the surface light source device.

The light guiding plate 5 in the first embodiment is made of a transparent acrylic resin, polycarbonate resin, glass, or the like. The light guiding plate 5 has a plate-like shape as shown in FIGS. 1 and 2, and has the cylindrical recess 6 formed on its reflection and emission surface 9. A light scattering portion (not illustrated) for disturbing the light propagating direction to direct light to the emission surface is formed on the reflection and emission surface 9 of the light guiding plate 5. The light scattering portion functions as means for reflecting light toward the inside of the light guiding plate 5. Usable methods for reflecting light include a method for printing dot patterns on the reflection and emission surface 9, a method for roughening the reflection and emission surface 9 to form an embossed surface, a method for forming minute spherical surface or irregularity on the reflection and emission surface 9, or the like.

Roughening the emission surface 11 of the light guiding plate 5 to form the embossed surface can provide the effect same as that in a case of forming reflecting means to the reflection and emission surface 9 of the light guiding plate 5. Specifically, the propagating direction of the light incident on the emission surface 11 of the light guiding plate 5 is disturbed by the irregularity formed by roughening the emission surface 11. As a result, a part of the light incident on the emission surface 11 is reflected toward the inside of the light guiding plate 5, while the other lights are emitted to the outside of the light guiding plate 5 through the emission surface 11. Accordingly, even if the embossed surface is formed only on the emission surface 11 of the light guiding plate 5 without forming the reflecting means on the reflection and emission surface 9, a reflection function such as the dot pattern formed on the reflection and emission surface 9 can be provided.

The LED light source 4 according to the first embodiment is mounted to the LED substrate 3 and arranged so as to be inserted into the recess 6 as shown in FIG. 2. The LED substrate 3 holds the LED light source 4 and has a circuit pattern formed thereon for supplying electric power to the LED light source 4. The LED light source 4 is mounted to the LED substrate 3 that is a metal core (MC), whereby heat emitted from the LED light source 4 can efficiently be transmitted to the periphery. When the LED light source 4 is mounted to a thin FPC (Flexible Printed Circuit), heat from the LED light source 4 can further efficiently be transmitted to the periphery, and the outer dimension of the surface light source device can be reduced.

Figure 3:
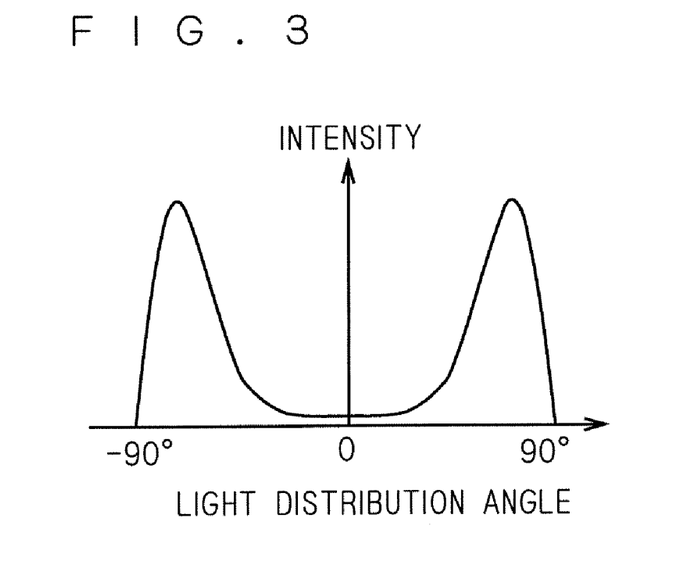
FIG. 3 is a graph for explaining a characteristic of an LED light source according to the embodiment 1 of the present invention.

When the LED light source 4 having the maximum luminance in generally the horizontal direction shown in FIG. 3 is used, light from the LED light source 4 is incident on the side face of the recess 6 of the light guiding plate 5 with an acute incident angle. Therefore, incident efficiency of light from the LED light source 4 is increased, whereby the luminance at the opening 1 of the housing 2 is increased.

The housing 2 according to the first embodiment has a reflection sheet 10 formed at its inside in order to prevent light from leaking to the outside as much as possible and to help light advance toward the opening 1. Usable materials for the reflection sheet 10 include a material obtained by mixing barium sulfate or titanium oxide into PP (polypropylene) or PET (polyethylene terephthalate), a material obtained by forming microbubbles to resin, a material in which silver is deposited on a metallic plate, a material in which a coating material containing titanium oxide is applied on a metallic plate, or the like. It is desirable that the reflectivity of the reflection sheet 10 is at least 90%. When a plurality of reflection sheets 10 are superimposed, the reflectivity increases, whereby the luminance at the opening 1 of the housing 2 increases.

When a dot pattern is printed on the reflection sheet 10 at the emission surface or at the reflection and emission surface, a luminous profile on the emission surface can be improved. When a colored printing is performed to the reflection sheet 10 at the emission surface or at the reflection and emission surface, a phenomenon in which a color of the emitted light changes because of being apart from the light source due to the light absorption by the light guiding plate 5 or light absorption by the reflection sheet 10 can be improved. Performing the colored printing on the reflection sheet 10 at the reflection and emission surface particularly desensitizes the affect to the emission surface, whereby subtle luminous unevenness or color irregularity at the emission surface can be corrected.

The diffusion plate 12 is arranged on the emission surface 11 of the light guiding plate 5 (at the opening 1 of the housing 2) as shown in FIG. 2. A material having light transmittance property, such as resin plate made of PET (polyethylene terephthalate), PMMA (acrylic), or PC (polycarbonate) or glass substrate, is used for the diffusion plate. A function for scattering incident light is provided to the diffusion plate 12 by mixing a reflection material into the above-mentioned materials, or by roughening the surface. The use of the diffusion plate 12 having the function described above makes it possible to obtain a surface light source device having a wide directivity. Depending upon the configuration of the surface light source device, a desired image quality may sometimes be obtained without providing the diffusion plate 12. In such a case, the diffusion plate 12 is not necessarily provided.

As shown in FIG. 2, optical sheets 13 composed of a plurality of optical sheets are provided on the diffusion plate 12. The optical sheets 13 have a structure in which a lens sheet is sandwiched between diffusion sheets. When the enhancement in the luminance is required, a plurality of lens sheets are used to optimally combine the direction of the prism formed on the individual sheet. When the enhancement of the diffusivity by the diffusion sheet is intended, it is considered to use at least two diffusion sheets. A single lens sheet may be used, or no lens sheet may be used, depending upon the light distribution characteristic. A protection sheet or polarization reflection sheet may be combined for the optical sheets 13. The optical sheets 13 may desirably have an optimum sheet structure considering the required luminance or light distribution characteristic.

Although not shown in FIGS. 1 and 2, a display panel is arranged on the surface light source device. Considerable display panels include a liquid crystal display panel that applies birefringence of liquid crystal, and a display panel having a transparent plate on which characters or pictures are printed. The description of the first embodiment describes a display device using a liquid crystal display panel for the display panel.

The liquid crystal display panel is composed of a counter substrate having formed thereon a color layer, light-shielding layer, counter electrode, and the like, a TFT array substrate having formed thereon a thin-film transistor (hereinafter referred to as TFT) serving as a switching device, pixel electrode, and the like, a spacer that holds a space between the counter substrate and the TFT array substrate, a seal material for bonding the counter substrate and the TFT array substrate to each other, liquid crystal nipped between the counter substrate and the TFT array substrate, a seal member for sealing an injection port from which the liquid crystal is injected, an orientation film for orientating the liquid crystal, and a polarizing plate (not shown). Since an existing liquid crystal panel can be used in the present invention, the detailed explanation thereof is omitted. A circuit board (not shown) for driving the liquid crystal display panel is provided to the display device.

Figure 4:
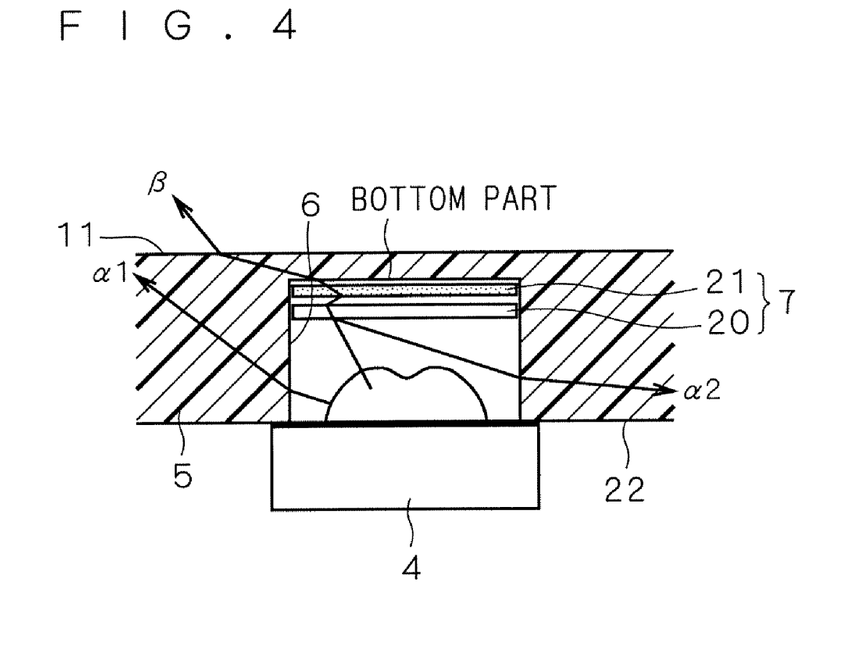
FIG. 4 is a sectional view showing light quantity adjusting means according to the embodiment 1 of the present invention.

Light quantity adjusting means 7 is provided at the bottom part of the recess 6. FIG. 4 is an enlarged sectional view showing the vicinity of the recess 6 of the light guiding plate 5. The light quantity adjusting means 7 shown in FIG. 4 is composed of a reflection sheet 20 and a diffusion sheet 21. Usable materials for the reflection sheet 20 include a material obtained by mixing barium sulfate or titanium oxide into PP (polypropylene) or PET (polyethylene terephthalate), a material obtained by forming microbubbles to resin, a material in which silver is deposited on a metallic plate, a material in which a coating material containing titanium oxide is applied on a metallic plate, or the like. In the present first embodiment, the material in which microbubbles are formed to the PET resin is used.

On the other hand, a material having light transmittance property, such as resin plate made of PET (polyethylene terephthalate), PMMA (acrylic), or PC (polycarbonate) or glass substrate, is used for the diffusion sheet 21. A function for scattering incident light is provided to the diffusion sheet 21 by mixing a reflection material into the above-mentioned materials, or by roughening the surface.

Figure 5:
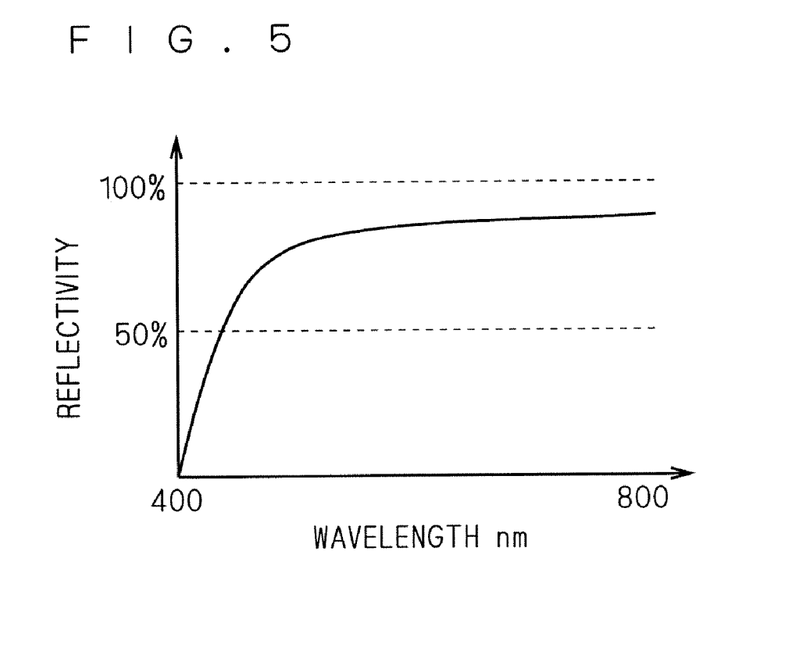
FIG. 5 is a graph for explaining a reflection characteristic of a reflection sheet used for the light quantity adjusting means according to the embodiment 1 of the present invention.
Figure 6:
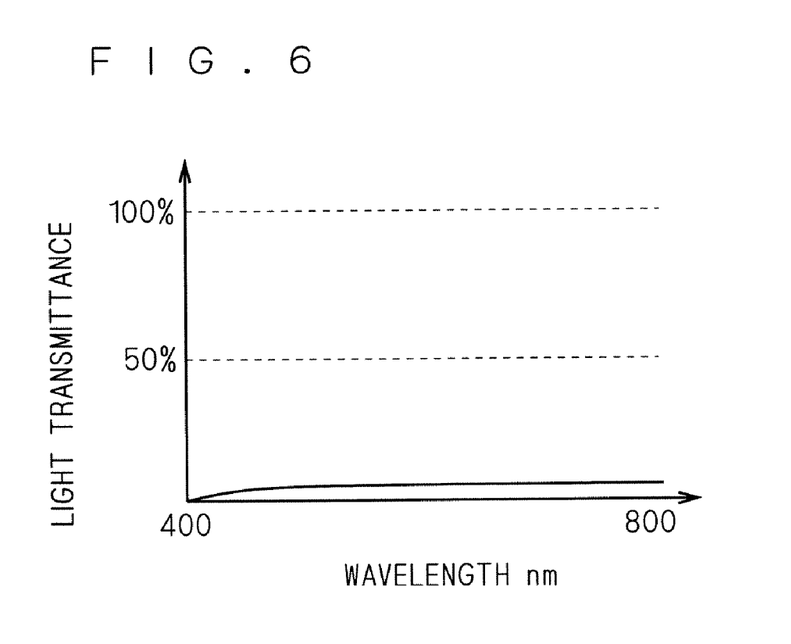
FIG. 6 is a graph for explaining a transmittance characteristic of the reflection sheet used for the light quantity adjusting means according to the embodiment 1 of the present invention.

The material in which microbubbles are formed to the PET resin is used for the reflection sheet 20 as described above. The reflection sheet 20 using the PET resin has a reflection characteristic as shown in FIG. 5 and a light transmission characteristic as shown in FIG. 6. In the reflection sheet 20 using the PET resin, the transmittance is reduced while the reflectivity is increased if the sheet is thick. On the contrary, if the reflection sheet 20 using the PET resin is thin, the transmittance is increased while the reflectivity is reduced.

The reflection sheet 20 used in the first embodiment has a light transmission characteristic with at least 2% of the total light transmittance that is the ratio of the transmitting total light (total incident light) incident on the refection sheet 20 as shown in FIG. 6. When the reflection sheet 20 having the total light transmittance of less than 2% is used, light emitted from the emission surface 11 in the vicinity of or immediately above the LED light source 4 reduces, with the result that the luminous unevenness might occur on the emission surface 11. Therefore, by using the reflection sheet 20 having the total light transmittance of at least 2%, the quantity of direct light incident on the emission surface 11 in the vicinity of or immediately above the LED light source 4 is adjusted to prevent the reduction of light emitted from the emission surface 11 in the vicinity of or immediately above the LED light source 4, whereby the luminous unevenness all over the emission surface 11 can be prevented. The use of the reflection sheet 20 having the total light transmittance of at least 2%, preferably 4 to 6%, can suppress the luminous unevenness on the emission surface 11 in the vicinity of the LED light source 4. When the total light transmittance of the reflection sheet 20 is changed, the quantity of the direct light incident on the emission surface 11 can be adjusted to thereby eliminate the luminous unevenness.

The reflection sheet 20 has a diffusing function for emitting the transmitted light to the emission surface 11 as diffusion light, whereby the luminous unevenness on the emission surface 11 in the vicinity of the LED light source 4 can further be suppressed. When the reflection sheet 20 using a material in which microbubbles are formed to the PET resin is used, for example, light reflected by the reflection sheet 20 becomes generally totally diffused light, and the transmitted light also becomes generally totally diffused light. Since the transmitted light is generally totally diffused light, and the diffusion effect is produced not at a part of the vicinity of the LED light source 4 but on the whole surface of the reflection sheet 20, the luminous unevenness on the emission surface 11 in the vicinity of the LED light source 4 can be suppressed. Further, since the luminous unevenness is difficult to occur even if the distance between the LED light source 4 and the emission surface 11 is shortened, a thin surface light source device can be realized.

Figure 7:
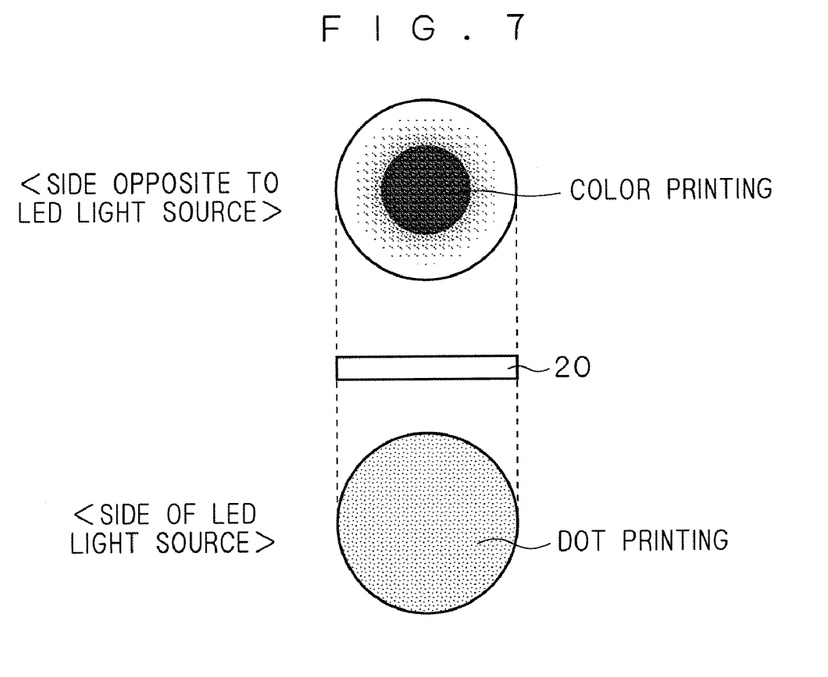
FIG. 7 is a schematic view of the reflection sheet used for the light quantity adjusting means according to the embodiment 1 of the present invention.

The reflection sheet 20 has printed thereon at the side of the LED light source 4 a black dot pattern that absorbs light, and has printed thereon at the side opposite to the LED light source 4 a color dot pattern. The dot pattern is formed in such a manner that micropatterns are printed on the reflection sheet 20 with black or color ink. The dot pattern may be printed by a screen printing method. It is desirable that the shape, size, arrangement, concentration, density, color, and the like of the printed dot pattern are optimized in view of the display quality on the emission surface of the surface display device. FIG. 7 shows an example of printing on the reflection sheet 20. In the reflection sheet 20 shown in FIG. 7, black dot patterns uniformly arranged are printed at the side of the LED light source 4, while color dot patterns arranged as concentrated on the center are printed at the side opposite to the LED light source 4. The diffusion sheet 21 may have black or color printing like the reflection sheet 20.

As shown in FIGS. 5 and 6, the reflection sheet 20 absorbs light having low wavelength. Therefore, the light passing through the reflection sheet 20 becomes yellowish light, so that the color is different at the portion of the emission surface 11 of the light guiding plate 5 where the light quantity adjusting means 7 is provided and at the other portion thereof. Accordingly, the color printing is performed particularly on the reflection sheet 20 at the side opposite to the LED light source 4 in the first embodiment. Consequently, the first embodiment can reduce color irregularity on the emission surface 11 (opening 1 of the housing 2) of the light guiding plate 5.

Although a single diffusion sheet 21 is employed in FIG. 4, the diffusion sheet 21 may be composed of a plurality of sheets. When the diffusion sheet 21 is composed of a plurality of sheets, light can further be diffused, and hence, the display quality on the emission surface 1 (opening section 1 of the housing 2) of the light guiding plate 5 can be improved. When the display quality on the emission surface 11 (opening 1 of the housing 2) of the light guiding plate 5 can sufficiently be secured only by the reflection sheet 20, the diffusion sheet 21 may not be provided.

Although a single reflection sheet 20 is also employed in FIG. 4, the reflection sheet 20 may be composed of a plurality of sheets. In this case, the reflection sheets 20 each having different thickness or each being different type may be combined. When a plurality of reflection sheets 20 are used, which reflection sheet a dot pattern is printed is optimized in view of the display quality on the emission surface 11 (opening 1 of the housing 2) of the light guiding plate 5.

Subsequently explained is the path in which the light emitted from the LED light source 4 is emitted from the emission surface 11 of the light guiding plate 5 and incident on the liquid crystal display panel. The light emitted from the LED light source 4 is directly incident on the light guiding plate 5 or is reflected by the light quantity adjusting means 7 and then incident on the light guiding plate 5 as shown in FIG. 4. The direct light or light reflected by the light quantity adjusting means 7 and incident on the light guiding plate 5 ($\alpha 1$, $\alpha 2$) is propagated in the light guiding plate 5 while repeating the total reflection at the boundary between the light guiding plate 5 and air layer. Then, the light propagated in the light guiding plate 5 is diffuse-reflected by the dot printing 22 (FIG. 4) performed on the reflection and emission surface 9 of the light guiding plate 5, whereby the propagating direction of the light changes. Due to the change in the propagating direction of the light, the light having an angle less than a critical angle with respect to the boundary between the light guiding plate 5 and the air layer is emitted from the emission surface 11 of the light guiding plate 5.

The light having an angle less than the critical angle with respect to the boundary between the light guiding plate 5 and the air layer is also emitted from the portion other than the emission surface 11, but this light is reflected by the reflection sheet 10 (FIG. 2) provided at the housing 2 and introduced again into the light guiding plate 5. Then, finally, this light is emitted from the emission surface 11 of the light guiding plate 5.

The light guiding plate 5 has a plate-like shape in the first embodiment. However, the present invention is not limited thereto. The light guiding plate 5 may have a wedge-like shape in which the thickness is reduced as being apart from the LED light source 4. The use of the light guiding plate 5 having the above-mentioned shape makes it possible to efficiently direct the propagated light to the emission surface 11. Therefore, the quantity of light reflected by the reflection sheet 10 provided at the side face 8 of the light guiding plate 5 reduces, whereby the reflection loss produced on the reflection sheet 10 at the side face 8 can be reduced, and hence, the emission amount on the emission surface 11 can be increased.

The light ($\beta$) passing through the reflection sheet 20 from the LED light source 4 is diffused by the diffusion sheet 21 to be incident on the light guiding plate 5 from the bottom part of the recess 6. Since the light incident on the light guiding plate 5 is finally emitted from the emission surface 11 of the light guiding plate 5, efficiency of use of light can be enhanced.

Compared to the light ($\alpha 1$) directly introduced into the light guiding plate 5 from the LED light source 4, the light ($\alpha 2$) reflected by the reflection sheet 20 to be incident on the light guiding plate 5 has, in most cases, an angle of incidence close to an obtuse angle with respect to the light guiding plate 5. Therefore, the light ($\alpha 2$) is likely to be emitted from the emission surface 11 in the vicinity of the LED light source 4. Accordingly, the black dot pattern is printed on the reflection sheet 20 at the side of the LED light source 4, and light is absorbed by the black dot pattern to reduce the reflected light. Consequently, the light emitted from the emission surface 11 in the vicinity of the LED light source 4 can be reduced, whereby the luminous unevenness on the emission surface 11 in the vicinity of the LED light source 4 can be reduced.

In order to correct the luminous change of the LED light source 4 on the emission surface 11, the black dot pattern is printed on the reflection sheet 20 at the side of the LED light source 4 in the surface light source device according to the first embodiment. Therefore, the luminous unevenness on the emission surface 11 can be reduced in the surface light source device according to the first embodiment.

The light, passing through the reflection sheet 20, at the short wavelength is absorbed as shown in FIG. 6. Therefore, in the surface light source device using the reflection sheet 20, light at the long wavelength, i.e., red component, increases, thereby producing color irregularity.

However, in the surface light source device according to the first embodiment, complementary color (e.g., blue) for canceling the tone change of light caused by the transmission through the reflection sheet 20 is printed on the reflection sheet 20 at the side opposite to the LED light source 4. Therefore, the color irregularity caused by the light quantity adjusting means 7 provided with the reflection sheet 20 can be reduced in the surface light source device according to the first embodiment.

In the light quantity adjusting means 7 according to the first embodiment, the reflection sheet 20, diffusion sheet 21, and light guiding plate 5 are arranged through the air layer. However, adhesive or the like can be provided on each sheet and each sheet can be bonded to each other, whereby the reflection sheet 20, diffusion sheet 21 and light guiding plate 5 can be arranged not through the air layer. Since the air layer is not interposed, the surface reflection generated on the boundary of the air layer can be eliminated, whereby the quantity of light emitted from the emission surface 11 of the light guiding plate 5 increases, and hence, the efficiency of use of light by the surface light source device can be enhanced. When the light quantity adjusting means 7 is fixed to the bottom part of the recess 6 of the light guiding plate 5, the efficiency of use of light by the surface light source device can be enhanced, and the light quantity adjusting means 7 can be prevented from moving due to the vibration or shock.

The adhesive or the like used for each sheet has preferably light transmittance of at least 95%. Further, the refractivity of the adhesive or the like is made generally equal to the refractivity of the reflection sheet 20, diffusion sheet 21 and light guiding plate 5. By virtue of this configuration, the mirror reflection at the boundary between the adhesive or the like and the reflection sheet 20, diffusion sheet 21 and light guiding plate 5 can be reduced. Further, the reflection sheet 20, diffusion sheet 21 and light guiding plate 5 may be entirely adhered with the adhesive or may be partly adhered. All sheets may be adhered with the adhesive or only some sheets may be adhered with the adhesive.

The planar shapes of the recess 6 at the bottom part (the part where the light quantity adjusting means 7 is provided) and at the edge part (the part where the LED light source 4 is inserted) are the same in the present embodiment. However, the first invention is not limited thereto. The planar shape may be adjusted so as to optimize the display quality on the emission surface 11 of the light guiding plate 5.

In the surface light source device according to the first embodiment, a mirror treatment, surface roughening, dot pattern printing, or color printing may be performed on the emission surface 11 or reflection and emission surface 9 of the light guiding plate 5. By performing surface roughening to the emission surface 11 or reflection and emission surface 9 of the light guiding plate 5 so as to form an embossed surface, the display quality on the emission surface 11 of the light guiding plate 5 can further be enhanced.

Although the color printing is performed to the reflection sheet 20 in the first embodiment, the same effect can be obtained by arranging a color conversion sheet on the reflection sheet 20 at the side opposite to the LED light source 4, instead of the color printing. The color conversion sheet is a sheet transmitting only light having specific wavelength. Examples of the color conversion sheet include transparent thin sheet-like cellophane. The use of the color conversion sheet having high transmittance of light at the short wavelength, compared to the transmittance of light at the long wavelength, provides an effect of reducing the aforesaid coloring due to the pass through the reflection sheet 20.

In the surface light source device according to the first embodiment, selective reflection sheet can be added to the optical sheets arranged on the light guiding plate 5. By providing the selective reflection sheet to the optical sheets 13 at the side of the light guiding plate 5, a part of light emitted from the emission surface 11 can be reflected by the selective reflection sheet to be returned to the light quantity adjusting means 7. Thus, an amount of light, which reaches the light quantity adjusting means 7, can be increased, thereby efficiently reducing luminous unevenness and color irregularity.

This selective reflection sheet has luminance increasing effects, and includes a prism sheet, which is shaped like a prism and returns light having been incident almost perpendicularly thereon to the light quantity adjusting means 7 by performing total reflection thereon twice, and a reflection type polarizing sheet adapted to separate the incident light to reflection light and transmission light according to a polarizing direction.

The display device according to the first embodiment is configured such that the light emitted from the emission surface 11 (opening 1 of the housing 2) of the light guiding plate 5 in the surface light source device passes through the diffusion plate 12 and optical sheets 13 to be incident on the liquid crystal display panel. In the liquid crystal display panel, the orientation of the liquid crystal layer is changed by turning on or off of voltage by a switching device (not illustrated) so as to modulate the light incident on the liquid crystal display panel according to a video signal to be displayed as red (R), green (G), or blue (B).

When LEDs, which respectively emit red (R), green (G), and blue (B) monochromatic color rays, are used as the light sources, emission spectrum of each of these colors has a narrow half-value width. There are few emission spectra corresponding to each of the colors other than red (R), green (G) and blue (B). Thus, as compared with a case of using a cold-cathode ray tube having emission spectra other than red (R), green (GI, or blue (B) as the light source, the device using such LEDs as the light source has a tendency that an amount of change in chromaticity in a case of absorbing shorter wavelength light by the reflection sheet 20 increases. Consequently, color irregularity, which is not clearly visually recognized in a case of using the cold-cathode tube as the light source, can be easily and visually recognized in a case of employing the LEDs emitting monochromatic color rays as the light sources. However, the color irregularity can be eliminated by using the reflection sheet 20 to which a color printing is performed in the first embodiment as described above.

The first embodiment describes a case where a single LED light source 4 is used. However, the present invention is not limited thereto. A plurality of LED light sources 4 can be employed in the event that luminance is required or the size of the opening 1 is great. The position of the LED light source 4 is not limited to the center of the housing 2. The LED light source 4 can be arranged at the optimum position considering the luminance distribution on the emission surface 11.

As described above, the surface light source device according to the first embodiment has the light quantity adjusting means 7 provided with the reflection sheet 20 and diffusion sheet 21 at the bottom part of the recess 6, thereby providing effects of eliminating luminous unevenness or color irregularity, enhancing efficiency of use of light, enhancing evenness of the in-plane luminance, and providing sufficient image quality.

Embodiment 2

Figure 8:
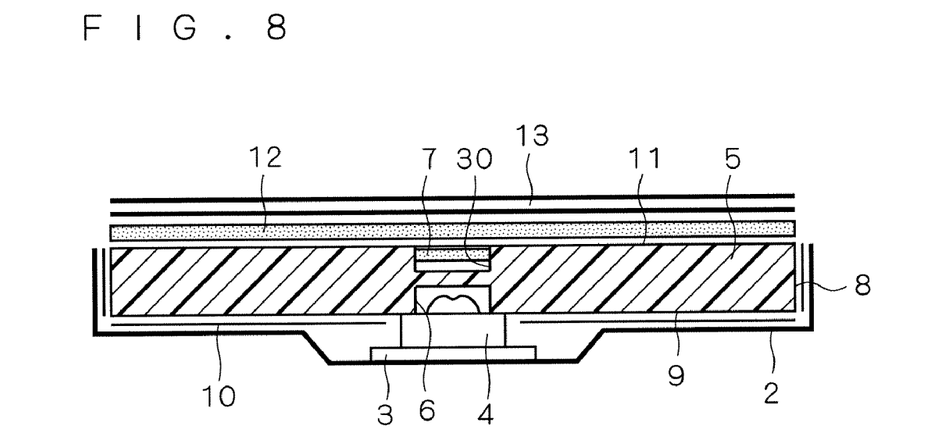
FIG. 8 is a sectional view of a surface light source device according to an embodiment 2 of the present invention.

FIG. 8 is a sectional view showing a surface light source device according to a second embodiment of the present invention. In the surface light source device shown in FIG. 8, the light guiding plate 5 is provided at the position corresponding to the LED light source 4 and has a cylindrical recess 6 that stores a part of the LED light source 4 and a cylindrical recess 30 formed on the surface thereof opposite to the surface having the recess 6 formed thereon, wherein the light quantity adjusting means 7 for adjusting light from the LED light source 4 is further provided at the bottom part of the recess 30. Specifically, the light guiding plate 5 shown in FIG. 8 has the recess 6 at the side of the reflection and emission surface 9 and the recess 30 at the side of the emission surface 11 so as to be disposed back-to-back. Further, the light quantity adjusting means 7 is provided at the bottom part of the recess 6 at the side of the reflection and emission surface 9 in the first embodiment, but in the second embodiment, the light quantity adjusting means 7 is provided at the bottom part of the recess 30 at the emission surface 11.

The surface light source device in the second embodiment is the same as that in the first embodiment except that the recess 30 is added to the configuration of the first embodiment and the light quantity adjusting means 7 is arranged at the recess 30. Therefore, the components in the surface light source device shown in FIG. 8 that are the same as those of the surface light source device shown in FIG. 1 are identified by the same numerals, and the explanation thereof is omitted. The surface light source device in the second embodiment provides the operation and the effect same as those by the surface light source device in the first embodiment except for the operation and effect specific to the surface light source device in the second embodiment.

In the surface light source device according to the second embodiment, the recess 30 is formed to the light guiding plate 5 at the side of the emission surface 11, whereby the light quantity adjusting means 7 can be arranged after the light guiding plate 5 is placed on the housing 2 and the LED light source 4 upon assembling the surface light source device. Therefore, the light quantity adjusting means 7 can be exchanged without removing the light guiding plate 5 after the assembly of the surface light source device, thereby enhancing assembling property.

Since the light emitted from the LED light source 4 is further diffused by performing the dot pattern printing or embossing process to the bottom part of the recess 30, the luminous unevenness or color irregularity on the emission surface 11 of the light guiding plate 5 can be reduced, thereby enhancing display quality.

Since the light quantity adjusting means 7 is adhered to the bottom of the recess 30, the surface reflection, caused by an air layer, at the boundary between the bottom part of the recess 30 and the light quantity adjusting means 7 is reduced, whereby the luminance on the emission surface 11 of the light guiding plate 5 increases.

The planar shape of the recess 30 is the same as the planar shape of the recess 6, and they may be similar in shape. The planar shape of the recess 30 may be different from the planar shape of the recess 6. Further, the depth of the recess 30 can be made deeper than the thickness of the light quantity adjusting means 7. The side face of the recess 30 may be embossed. It is desirable that the planar shape and depth of the recess 30 is optimized in view of the display quality on the emission surface 11 of the light guiding plate 5.

The planar shape of the light quantity adjusting means 7 is basically the same as the planar shape of the recess 30. However, they may be similar in shape, and the planar shape of the light quantity adjusting means 7 may be made smaller than the planar shape of the recess 30. The planar shape of the light quantity adjusting means 7 may be different from the planar shape of the recess 30 so long as it is the size capable of being provided at the bottom part of the recess 30. It is desirable that the planar shape of the light quantity adjusting means 7 is optimized in view of the display quality on the emission surface 11 of the light guiding plate 5.

A transparent sheet (not illustrated) may be adhered onto the emission surface 11 of the light guiding plate 5 for positioning the light quantity adjusting means 7. The transparent sheet desirably has light transmittance of at least 95%.

Embodiment 3

Figure 9:
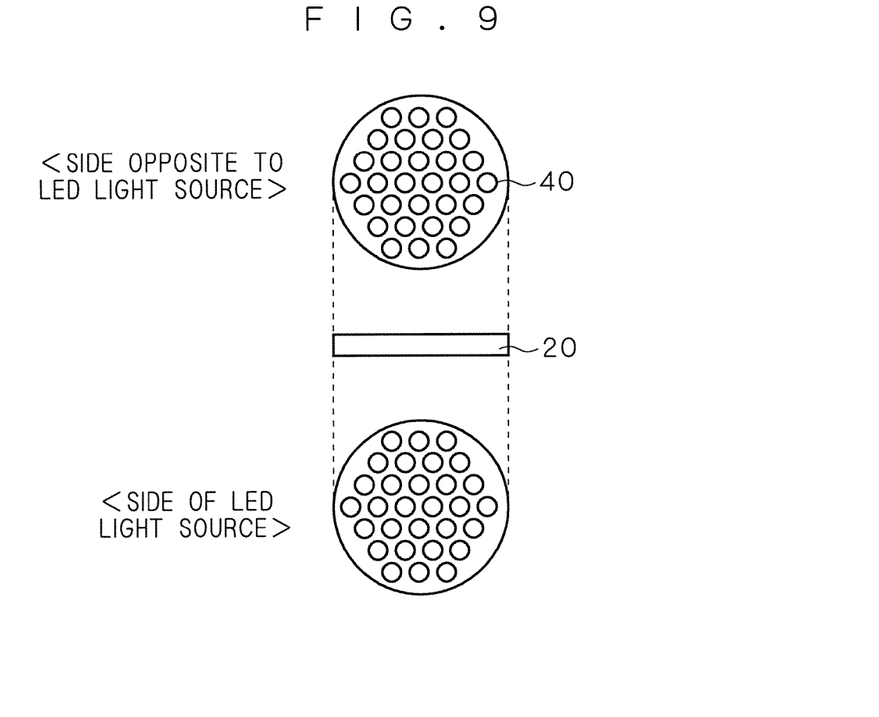
FIG. 9 is a schematic view of a reflection sheet used for light quantity adjusting means according to an embodiment 3 of the present invention.

FIG. 9 is a schematic view of the reflection sheet 20 used for the light quantity adjusting means 7 according to a third embodiment of the present invention. The reflection sheet 20 shown in FIG. 9 has a configuration in which a plurality of holes 40 are formed on the material of the reflection sheet 20 explained with respect to the first embodiment. The surface light source device in the third embodiment is the same as that shown in the first and second embodiments except that the reflection sheet 20 shown in FIG. 9 is used for the light quantity adjusting means 7. Therefore, the explanations for the components other than the reflection sheet 20 are omitted. The surface light source device in the third embodiment provides the operation and the effect same as those by the surface light source device in the first embodiment except for the operation and effect specific to the surface light source device in the third embodiment.

Usable materials for the reflection sheet 20 shown in FIG. 9 include a material obtained by mixing PP (polypropylene) or PET (polyethylene terephthalate) with barium sulfate or titanium oxide, a material obtained by forming microbubbles in a resin, a material obtained by depositing silver on a metal plate, or a material obtained by applying a coating compound, which includes titanium oxide, onto a metal plate. The reflectivity of the reflection sheet 20 is desirably at least 90%. The reflectivity can be enhanced by superimposing a plurality of reflection sheets 20, whereby luminance on the emission surface 11 can be increased.

In the third embodiment, a plurality of holes 40 are formed on the reflection sheet 20. The reflectivity or transmittance of the reflection sheet 20 can optionally be adjusted by the size, number, and shape of the holes 40. Therefore, compared to a case where the reflectivity or transmittance is adjusted by performing printing to the reflection sheet 20, the reflection sheet 20 having a plurality of holes 40 formed thereon has no deficiency due to the adherence of printing or deterioration of ink, thereby having high reliability. Accordingly, the surface light source device using the reflection sheet 20 having a plurality of holes 40 formed thereon has reduced secular changes.

Embodiment 4

Figure 10A:
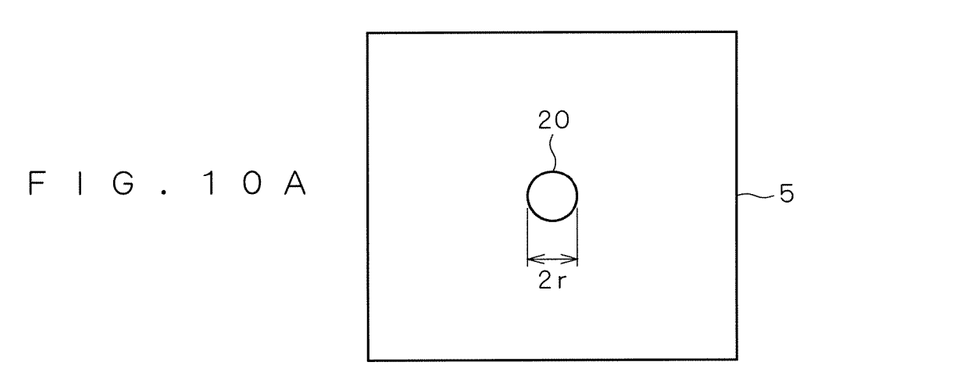
FIGS. 10A and 10B are a front view and a sectional view of a light guiding plate and a reflection sheet according to an embodiment 4 of the present invention.
Figure 10B:
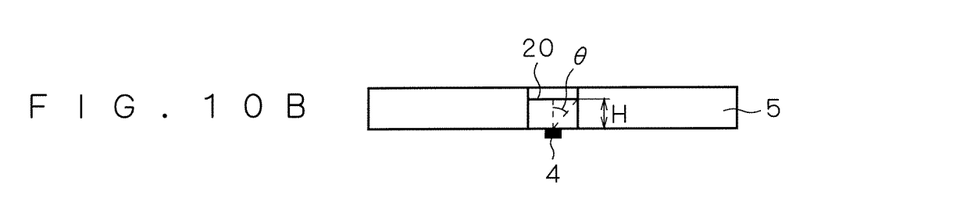

FIGS. 10A and 10B are a schematic front view (FIG. 10A) and a sectional view (FIG. 10B) of the light guiding plate 5 and the reflection sheet 20 according to a fourth embodiment of the present invention. In the first embodiment, the reflection sheet 20 having total light transmittance of at least 2% is used, but the total light transmittance of the reflection sheet 20 depends upon various conditions. In the fourth embodiment, the reflection sheet 20 having the total light transmittance that satisfies Equation 1 is used. The surface light source device in the fourth embodiment provides the operation and the effect same as those by the surface light source device in the first embodiment except for the operation and effect specific to the surface light source device in the fourth embodiment. The components in the surface light source device in the fourth embodiment other than the light guiding plate 5 and the reflection sheet 20 shown in FIGS. 10A and 10B are the same as those in the first embodiment.

In FIGS. 10A and 10B, the average radius of the reflection sheet 20 is defined as r, the distance from the LED light source 4 to the reflection sheet 20 is defined as H, the light-emitting area on the LED light source 4 is defined as S, the total light quantity of the LED light source 4 is defined as L, and the total light transmittance of the reflection sheet 20 is defined as t. Firstly, supposing that the angle θ made from immediately above the LED light source 4 to the edge of the reflection sheet 20 is defined as θ=tan$^{-1}$(r/H), the light quantity L1 incident on the reflection sheet 20 is represented by the equation of L1=(1−cos θ)L. The quantity L2 of light incident on the light guiding plate 5 other than the reflection sheet 20 is represented by the equation of L2=L cos θ.

Since the area of the reflection sheet 20 is S1=πr$^2$, the quantity of emission light B1 per unit area on the reflection sheet 20 is represented by t×(1−cos θ)L/πr$^2$. Since the area of the emission surface other than the reflection sheet 20 is S2=S−πr$^2$ the quantity of emission light B2 per unit area on the emission surface other than the reflection sheet 20 is represented by L cos θ/(S−πr$^2$) Accordingly, in order to reduce the luminous unevenness in the surface light source device, the quantity of emission light B1 and the quantity of emission light B2 need to establish B1≧B2. From this relationship, the value t of the total light transmittance of the reflection sheet 20 can be obtained in accordance with Equation 1.

$$t \geq \frac{\pi r^2 \cos\theta}{(1-\cos\theta)(S-\pi r^2)} \quad \text{[Equation 1]}$$

Since the reflection sheet 20 satisfying Equation 1 is used in the surface light source device according to the fourth embodiment, the light quantity of the direct light incident on the emission surface 11 in the vicinity of or immediately above the LED light source 4 is adjusted, whereby the luminous unevenness on the entire emission surface 11 can be prevented.

While the invention has been shown and described in detail, the foregoing description is in all aspects illustrative and not restrictive. It is therefore understood that numerous modifications and variations can be devised without departing from the scope of the invention.

What is claimed is:

1. A surface light source device comprising:
   a housing having an opening portion on at least one face;
   a light source held by one face of the housing opposing said opening portion, the light source being a point light source; and
   a light guiding plate arranged at a position so as to cover said opening portion and said light source, and including an emission surface to emit light and a reflection and emission surface opposing said emission surface,
   wherein
   said light guiding plate includes:
      a first cylindrical recess provided at a position corresponding to said light source in said reflection and emission surface for storing a part of said light source; and
      a second cylindrical recess provided in said light emission surface opposite to said first cylindrical recess; and
   the surface light source device further comprises light quantity adjusting means provided at a bottom part of said second recess for adjusting light from said light source,
   wherein said light quantity adjusting means includes means for reflecting a portion of light from said light source and for transmitting at least 2% of light transmitted by said light source.

2. The surface light source device according to claim 1, wherein said means for reflecting is a reflection sheet.

3. The surface light source device according to claim 2, wherein said reflection sheet has a diffusion function for diffusing transmitted light.

4. The surface light source device according to claim 2, wherein said light quantity adjusting means further includes a diffusion sheet for diffusing light from said light source.

5. The surface light source device according to claim 4, wherein said diffusion sheet has black printing provided on a surface thereof adjacent to said light source.

6. The surface light source device according to claim 4, wherein said diffusion sheet has color printing provided on a surface thereof on a side opposite to said light source.

7. The surface light source device according to claim 2, wherein said reflection sheet has black printing provided on a surface thereof adjacent to said light source.

8. The surface light source device according to claim 7, wherein one of said black printing is dot pattern printing.

9. The surface light source device according to claim 2, wherein said reflection sheet has color printing provided on a surface thereof on a side opposite to said light source.

10. The surface light source device according to claim 9, wherein the color of said printing is blue.

11. The surface light source device according to claim 2, wherein said reflection sheet has a plurality of holes.

12. The surface light source device according to claim 1, wherein said light quantity adjusting means further includes a diffusion sheet for diffusing light from said light source.

13. The surface light source device according to claim 1, wherein said light source is a light-emitting diode.

14. The surface light source device according to claim 1, wherein said light source is a white light-emitting diode.

15. The surface light source device according to claim 1, wherein the second cylindrical recess is adjacent to said first cylindrical recess so that a portion of the light emitted from the light source is first reflected by the light adjusting means and is thereafter incident on the light guiding plate.

16. The surface light source device according to claim 1, wherein a diameter of the first cylindrical recess is the same length as a diameter of the second cylindrical recess.

17. A display device comprising:
   a surface light source device having an opening portion, the light source being a point light source; and
   a display panel arranged above said opening portion of said surface light source device,
   wherein
   the surface light source device includes:
      a housing in which said opening portion is located on at least one face;
      a light source held by one face of said housing opposing said opening portion; and
      a light guiding plate arranged at a position so as to cover said opening portion and said light source, and including an emission surface to emit light and a reflection and emission surface opposing said emission surface;
   said light guiding plate includes:
      a first cylindrical recess provided at a position corresponding to said light source in said reflection and emission surface for storing part of said light source; and a second cylindrical recess provided in said light emission surface opposite to said first cylindrical recess; and the surface light source device further comprises light quantity adjusting means provided at a bottom part of said second cylindrical recess for adjusting light from said light source, wherein said light quantity adjusting means includes means for reflecting a portion of light from said light source and for transmitting at least 2% of light transmitted by said light source.

18. The display device according to claim 17, wherein the second cylindrical recess is adjacent to said first cylindrical recess so that a portion of the light emitted from the light source is first reflected by the light adjusting means and is thereafter incident on the light guiding plate.

19. The display device according to claim 17, wherein a diameter of the first cylindrical recess is the same length as a diameter of the second cylindrical recess.

20. The display device according to claim 17, wherein the means for reflecting is a reflection sheet.

* * * * *